US 008126766B2

(12) United States Patent
Alexander

(10) Patent No.: US 8,126,766 B2
(45) Date of Patent: Feb. 28, 2012

(54) INTERACTIVE USER INTERFACE FOR COLLECTING AND PROCESSING NOMENCLATURE AND PLACEMENT METRICS FOR WEBSITE DESIGN

(75) Inventor: Miriam Alexander, Los Angeles, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1243 days.

(21) Appl. No.: 11/606,520

(22) Filed: Nov. 29, 2006

(65) Prior Publication Data

US 2008/0126175 A1   May 29, 2008

(51) Int. Cl.
*G06Q 10/00*   (2006.01)
(52) U.S. Cl. ........................................ 705/7.32
(58) Field of Classification Search .................. None
See application file for complete search history.

(56) References Cited

U.S. PATENT DOCUMENTS

| | | | | |
|---|---|---|---|---|
| 5,845,299 A * | 12/1998 | Arora et al. | ..................... | 715/209 |
| 6,141,010 A * | 10/2000 | Hoyle | ............................ | 715/854 |
| 6,161,112 A * | 12/2000 | Cragun et al. | ................. | 715/251 |
| 6,189,029 B1 * | 2/2001 | Fuerst | ............................ | 709/217 |
| 6,236,975 B1 * | 5/2001 | Boe et al. | ...................... | 705/7.32 |
| 6,278,449 B1 * | 8/2001 | Sugiarto et al. | ................ | 715/826 |
| 6,359,634 B1 * | 3/2002 | Cragun et al. | ................. | 715/777 |
| 6,405,224 B1 * | 6/2002 | Van Der Meer | ............... | 715/273 |
| 6,421,724 B1 * | 7/2002 | Nickerson et al. | ............. | 709/224 |
| 6,539,392 B1 * | 3/2003 | Rebane | ........................... | 705/10 |
| 6,606,581 B1 * | 8/2003 | Nickerson et al. | ............. | 702/186 |
| 6,760,043 B2 * | 7/2004 | Markel | ........................... | 715/717 |
| 6,785,717 B1 * | 8/2004 | Nickerson et al. | ............. | 709/219 |
| 6,928,392 B2 * | 8/2005 | Nickerson et al. | ............. | 702/186 |
| 6,934,697 B1 * | 8/2005 | Warren | ................................ | 1/1 |
| 6,941,376 B2 * | 9/2005 | Mitchell et al. | ................ | 709/229 |
| 7,085,820 B1 * | 8/2006 | Nickerson et al. | ............. | 709/219 |
| 7,092,821 B2 * | 8/2006 | Mizrahi et al. | ..................... | 702/1 |
| 7,103,642 B1 * | 9/2006 | Chen et al. | ....................... | 709/218 |
| 7,130,885 B2 * | 10/2006 | Chandra et al. | ................ | 709/206 |
| 7,181,696 B2 * | 2/2007 | Brock | ............................ | 715/758 |
| 7,216,149 B1 * | 5/2007 | Briscoe et al. | ................. | 709/217 |
| 7,370,285 B1 * | 5/2008 | Nickerson et al. | ............. | 715/808 |
| 7,398,233 B1 * | 7/2008 | Bayer et al. | ...................... | 705/29 |

(Continued)

OTHER PUBLICATIONS

Marek Kowalkiewicz, Maria E. Orlowska, Tomasz Kaczmarek, Witold Abramowicz (2006). Towards more personalized Web: Extraction and integration of dynamic content from the Web. In Proceedings of the 8TH Asia Pacific Web Conference APWEB.*

(Continued)

*Primary Examiner* — Lynda Jasmin
*Assistant Examiner* — Brett Feeney
(74) *Attorney, Agent, or Firm* — Martine Penilla Group LLP

(57) ABSTRACT

Computer implemented methods for conducting interactive surveys that define aspects of a web page, is disclosed. One method includes generating an interactive survey user interface (UI), where the interactive survey UI provides a plurality of selectable nomenclature items for a plurality of page objects of the web page. Then, enabling selection of one nomenclature item from the plurality of selectable nomenclature items. A drag and drop operation enables the selection of the one nomenclature item and dragging to the one of the plurality of page objects to define a placement for the one nomenclature item. The selection of the one nomenclature item and the defined placement is received to build metrics from multiple survey participants, where the metrics are used to define recommendation for rendering the plurality of page objects on the web page. The recommendations identify nomenclature and placement of page objects for the design of the web page.

23 Claims, 9 Drawing Sheets

U.S. PATENT DOCUMENTS

| | | | |
|---|---|---|---|
| 7,404,141 B1 * | 7/2008 | Giljum et al. | 715/234 |
| 7,441,196 B2 * | 10/2008 | Gottfurcht et al. | 715/740 |
| 7,478,121 B1 * | 1/2009 | Nickerson et al. | 709/203 |
| 7,809,602 B2 * | 10/2010 | Nickerson et al. | 705/10 |
| 2002/0072955 A1 * | 6/2002 | Brock | 705/10 |
| 2002/0103805 A1 * | 8/2002 | Canner et al. | 707/100 |
| 2002/0111865 A1 * | 8/2002 | Middleton et al. | 705/14 |
| 2002/0152110 A1 * | 10/2002 | Stewart et al. | 705/10 |
| 2002/0152137 A1 * | 10/2002 | Lindquist et al. | 705/27 |
| 2003/0048290 A1 * | 3/2003 | Leone et al. | 345/731 |
| 2004/0010755 A1 * | 1/2004 | Hamada | 715/513 |
| 2004/0019688 A1 * | 1/2004 | Nickerson et al. | 709/229 |
| 2004/0049417 A1 * | 3/2004 | Nickerson et al. | 705/10 |
| 2004/0049534 A1 * | 3/2004 | Nickerson et al. | 709/203 |
| 2004/0104946 A1 * | 6/2004 | Li | 345/853 |
| 2005/0144324 A1 * | 6/2005 | George et al. | 709/246 |
| 2005/0235256 A1 * | 10/2005 | Freydl | 717/107 |
| 2006/0174199 A1 * | 8/2006 | Soltis et al. | 715/700 |
| 2006/0178193 A1 * | 8/2006 | Hunter | 463/17 |
| 2006/0184642 A1 * | 8/2006 | Red et al. | 709/217 |
| 2006/0236241 A1 * | 10/2006 | Harada et al. | 715/700 |
| 2007/0111189 A1 * | 5/2007 | Nelson | 434/350 |
| 2007/0282693 A1 * | 12/2007 | Staib et al. | 705/26 |
| 2008/0015929 A1 * | 1/2008 | Koeppel et al. | 705/10 |
| 2008/0015952 A1 * | 1/2008 | Medved et al. | 705/27 |
| 2008/0033790 A1 * | 2/2008 | Nickerson et al. | 705/10 |
| 2008/0040683 A1 * | 2/2008 | Walsh | 715/786 |

OTHER PUBLICATIONS

T. Comver and J. Maltby. Evaluating usability of screen design with layout complexity. In Proceedings of OZCHI'95, the CHISIG Annual Conference on Human-Computer Interaction, Full Papers, pp. 175-178, 1995.*

Xavier Drèze and Fred Zufryden (1998). Testing Web Site Design and Promotional Content. University of Southern California Publication. pp. 1-43.*

Ivory MY and Hearst MA (2002). Improving Web Site Design. IEEE Internet Computing. pp. 56-65.*

Kinzie Mb, Cohn WF, Julian MF and Knaus WA (2002). Web Site Design: Needs Assessment, User Interface Design, and Rapid Prototyping. Journal of the American Medical Informatics Association vol. 9 No. 4 Jul. / Aug. pp. 320-330.*

Kothari R and Basak J (2002). Perceptually Motivated Measures for Capturing Proximity of Web Page Elements: Towards Automated Evaluation of Web Page Layouts. IBM Research Laboratories Publication. pp. 1-15.*

Jochen Rode, Mary Beth Rosson, and Manuel A. Pérez Quiñones (2005). End User Development of Web Applications. Kluwer Academic Publishers. pp. 1-26.*

Jonathan W Palmer (2002). Web site usability, design, and performance metrics. Information Systems Research; Jun. 2002; 13(2): 151-168.*

Bruce W. N. Lo and Panqun Gong (2005). Cultural Impact on the Design of E-Commerce Websites: Part I—Site Format and Layout. Issues in Information Systems. 2: 182-188.*

Ruihua Song, Haifeng Liu, Ji-Rong Wen and Wei-Ying Ma (2004). Learning Important Models for Web Page Blocks based on Layout and Content Analysis. SIGKDD Explorations. 6(2):14-23.*

Sears A (1992). Layout Appropriateness: A metric for evaluating user interface widget layout. Human-Computer Interaction Laboratory & Computer Science Department University of Maryland Publication. Dec. 1992. pp. 1-23.*

Christopher Van Buiten (1998). Putting Your Customers to Work: Design of Internet Environments to Facilitate Customer Participation in the Conceptual Design of New Products. Thesis MIT. 1-150. Can not print. Please see link for download: http://dspace.mit.edu/bitstream/handle/1721.1/9760/42788444.pdf?sequence=1.*

* cited by examiner

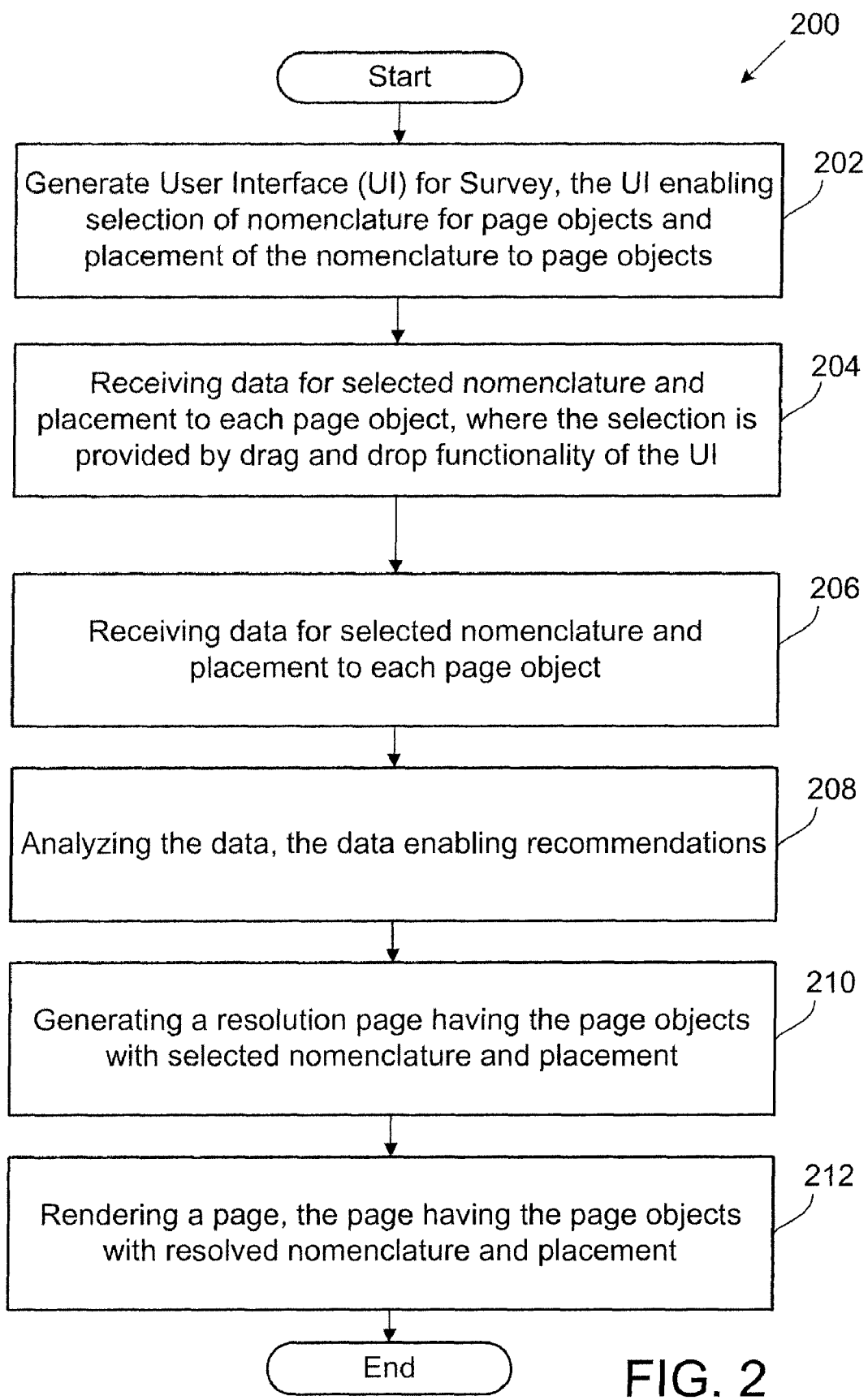

| Nomenclature (From Areas 1-4) | Person 1: Selected Position | Person 2: Selected Position | Person 3: Selected Position | Person 4: Selected Position |
|---|---|---|---|---|
| Product | Tab 1 | X | Tab 1 | X |
| Choose your product | X | Tab 2 | X | X |
| Gear | X | X | X | X |
| Gadgets | X | X | X | Tab 3 |
| Advise | X | Tab 1 | X | X |
| How To | X | X | X | X |
| Know How | Tab 2 | X | Tab 2 | X |
| Wow That's How | X | X | X | X |
| So That's How | X | X | X | X |
| Use Your Product | X | X | X | Tab 1 |
| Web Shows | X | X | X | X |
| Tech Shows | Tab 4 | X | X | Tab 4 |
| Shows About Tech | X | Tab 3 | Tab 3 | X |
| My Tech | X | X | Tab 4 | Tab 2 |
| My Stuff | Tab 3 | Tab 4 | X | X |

| Nomenclature | Person 5: Selected Position | Person 6: Selected Position | Person 7: Selected Position | Person 8: Selected Position |
|---|---|---|---|---|
| Product | X | X | X | X |
| Choose your product | Tab 2 | X | Tab 2 | Tab 2 |
| Gear | X | Tab 3 | X | X |
| Gadgets | X | X | X | X |
| Advise | X | Tab 1 | X | X |
| How To | X | X | X | X |
| Know How | Tab 3 | X | X | Tab 3 |
| Wow That's How | X | X | Tab 4 | X |
| So That's How | X | X | X | X |
| Use Your Product | X | X | X | X |
| Web Shows | X | X | X | X |
| Tech Shows | Tab 4 | Tab 2 | X | Tab 4 |
| Shows About Tech | X | X | Tab 3 | X |
| My Tech | X | X | Tab 1 | X |
| My Stuff | Tab 1 | Tab 4 | X | Tab 1 |

FIG. 7

| Metrics on Nomenclature Selected | Times Selected | Position Tab 1 | Position Tab 2 | Position Tab 3 | Position Tab 4 | Recommend |
|---|---|---|---|---|---|---|
| Product | | | | | | |
| Choose your product (AREA 1) | 2 | 2 | | | | |
| Gear | 4 | | 4 | | | Place in Tab 2 |
| Gadgets | 1 | | | 1 | | |
| Advise | 2 | 2 | | | | |
| How To | 0 | | | 1 | | |
| Know How (AREA 2) | 4 | | 2 | 2 | | Place in Tab 3 or Tab 2 |
| Wow That's How | 1 | | | | 1 | |
| So That's How | 0 | | | | | |
| Use Your Product | 1 | 1 | | | | |
| Web Shows | 0 | | | | | |
| Tech Shows (AREA 3) | 4 | | 1 | 3 | 4 | Place in Tab 4 |
| Shows About Tech | 4 | | 1 | | | |
| My Tech | 3 | 1 | | 1 | 1 | |
| My Stuff (AREA 4) | 5 | 2 | | | 3 | Place in Tab 4 |

FIG. 8

| Selected Word (nomenclature) | Conflict Resolution (designer choice or rule based) | Resolution Reason |
|---|---|---|
| Choose your product (Area 1) | Place in Tab 2 | Tab 2 Clear Winner |
| Know How (Area 2) | Place in Tab 3 | Tab 3 selected, as Tab 2 is strongly preferred for other word |
| Tech Shows (Area 3) | Place in Tab 4 | Tab 4 clear winner |
| My Stuff (Area 4) | Place in Tab 1 | Tab 1 is second choice, but Tab 4 was more preferred for other word |

FIG. 9

INTERACTIVE USER INTERFACE FOR COLLECTING AND PROCESSING NOMENCLATURE AND PLACEMENT METRICS FOR WEBSITE DESIGN

BACKGROUND

1. Field of the Invention

The present invention relates to website design, and more particularly to methods for using dynamic survey data to produce recommendations for appropriate nomenclature and placement of objects on a page.

2. Description of the Related Art

The computing industry has seen many advances in recent years, and such advances have produced a multitude of products and services. Internet websites are examples of products and services, which are created to give users access to particular types of services, data, or searching capabilities. Today, websites can be readily created by most individuals desiring to post information or provide access or connectivity to other data. However, when websites are created for commercial purposes, the presentation of data on a page can have either positive or negative impacts on its use, functionality and associated commercial success. For this reason, commercial entities routinely take surveys requesting target audiences to comment on a number of design aspects. Surveys may be completed before a website is launched, when redesign is needed, or during its active implementation.

Commonly, surveys are geared to ask questions regarding a site's usefulness, its presentation of data, and other related items. The surveys, however, are linearly conducted, such that questions are presented "one-at-a-time", and the response is saved to a survey database. The result, however, produces one dimensional data that cannot be combined to produce good data. For instance, if a survey participant is asked to comment on nomenclature used to define aspects of a page, that survey data, although useful, cannot be easily combined with other data. Other data may be, for instance, where should the page object be placed on the site.

Consequently, current techniques for gathering survey data, which may require simultaneously consideration of combinations of selections, are not capable of producing useful results.

In view of the foregoing, there is a need for methods and systems that enable Internet surveys to be taken through a dynamic user interface that provides combined data metrics. Such data may then be used to design a page of a website.

SUMMARY

Embodiments of the present invention provide methods and computer implemented systems that provide interactive surveys enabling respondents to choose nomenclature for page objects and define placement of the selected nomenclature. The selection and definition of placement, in accordance with one aspect of the invention, is completed through a single responsive action completed by the survey respondent. The single responsive action enables the selection of particular nomenclature for a page object while at the same time assigning its placement, as preferred by the survey respondent. As a result, selection of particular nomenclature for a page object or objects and the selection of placement is treated holistically.

The data from the survey can presented in a raw format, can be processed by simple analysis, or can be computer processed for presentation to the survey taker or website designer(s). If the data is computer processed, rules (defined or learned) may be applied so as to better refine or process the data and render a display of one or more recommendations. The recommendations may then enable the design of a page, parts of a page or mini-interface, or pages of a website, using knowledge obtained from the survey. By the holistic treatment of nomenclature and placement by way of the single responsive action on the part of the survey respondent, the knowledge learned is intimately more tightly coupled and enables richer results that can be intelligently applied toward the purpose of web page design.

It should be appreciated that the present invention can be implemented in numerous ways, such as a process, an apparatus, a system, a device or a method on a computer readable medium. Several inventive embodiments of the present invention are described below.

In one embodiment, a computer implemented method for conducting interactive surveys for defining aspects of a web page are disclosed. The method includes generating an interactive survey user interface (UI), where the interactive survey UI provides a plurality of selectable nomenclature items for a plurality of page objects of the web page. Selection of one nomenclature item is enabled from the plurality of selectable nomenclature items. The interactive survey of the method enables moving of the one nomenclature item to one of the plurality of page objects to define a placement for the one nomenclature item. The method enables analysis of the selection of the one nomenclature item and the defined placement to provide recommendation for rendering the page object on the web page.

In another embodiment, a computer implemented method for conducting interactive surveys for defining aspects of a web page, is disclosed. The method includes generating an interactive survey user interface (UI), where the interactive survey UI provides a plurality of selectable nomenclature items for a plurality of page objects of the web page. Then, enabling selection of one nomenclature item from the plurality of selectable nomenclature items. A drag and drop operation enabling the selection of the one nomenclature item and dragging to the one of the plurality of page objects to define a placement for the one nomenclature item. The selection of the one nomenclature item and the defined placement is received to build metrics from multiple survey participants, where the metrics are used to define recommendation for rendering the plurality of page objects on the web page. The recommendations identify nomenclature and placement of page objects for the design of the web page.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

FIG. 2 illustrates a flowchart of an example process for defining interactive user interfaces that collect multi-dimensional survey data to be used in designing aspects of a web page is provided, in accordance with one embodiment.

FIGS. 7-9 illustrate tables of results obtained from the interactive surveys, and associated processing to obtain recommendations, in accordance with one embodiment.

DETAILED DESCRIPTION

Broadly speaking, the embodiments of the present invention provide methods and computer implemented systems that define interactive surveys for enabling respondents to choose nomenclature for page objects and define placement of the selected nomenclature. The selection of a particular nomenclature item and the associated interactive placement generates rich multi-dimensional data that can be processed to generate recommendations, based on feedback of respondents to the interactive surveys. In one embodiment, the interactive placement functionality is facilitated through drag and drop process, that provides instant visual presentation to the survey respondent. The selection of the nomenclature and the placement, in the form of data metrics, is communicated back to a server or computers of the entity that generated the survey interactive interface. The data metrics can then be processed to recommend to the designer, specific nomenclature and placement. The data metrics can be processed by simple human analysis or by computer processes that apply rules (preset or learned over time) to define one or more recommendations, that enable the design of a page or pages of a website, using knowledge obtained from the survey.

The knowledge obtained is therefore more statistically valid, as nomenclature and placement of page objects are treated holistically during the survey process. Further, from the standpoint of the survey respondent, nomenclature and placement data is the simple result of a single responsive action. An example of a single responsive action is facilitated by a drag and drop feature of an interactive user interface defined for the survey. Other examples of responsive actions may include, without limitations, moving graphics, altering graphics, shifting graphics, cut and past functions, two dimensional pull down menus, selection menus, delete and re-type, etc.

With the above overview in mind, the following description provides numerous specific details set forth in order to provide a thorough understanding of the present invention. It will be apparent, however, to one skilled in the art that the present invention may be practiced without some or all of these specific details. Operations may be done in different orders, and in other instances, well known process operations have not been described in detail in order not to unnecessarily obscure the present invention. Several exemplary embodiments of the invention will now be described in detail with reference to the accompanying drawings.

Figure 1:
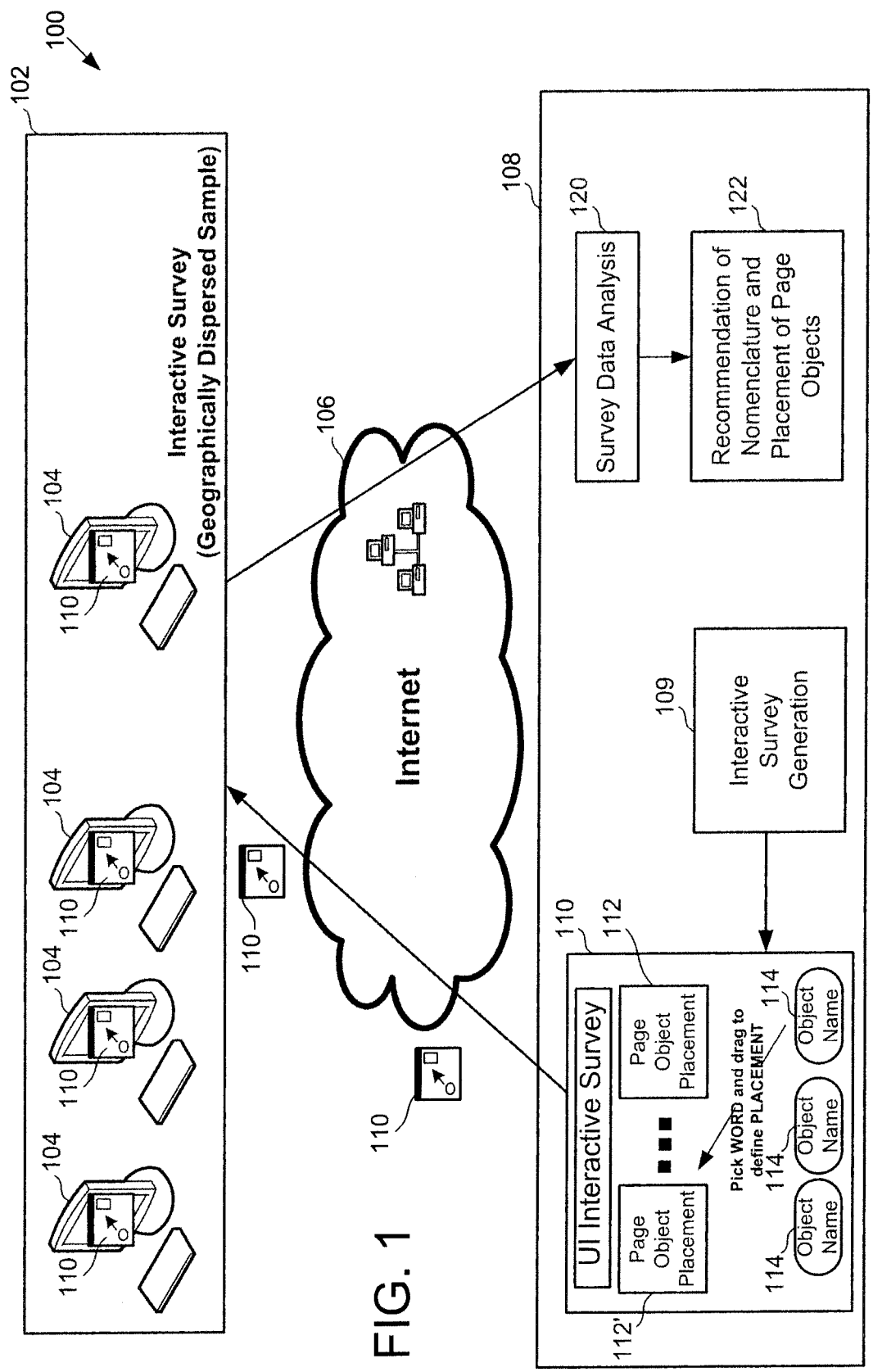
FIG. 1 illustrates a system diagram for defining interactive surveys and processing results from the interactive surveys to generate recommendations for nomenclature to be used on particular page objects of a website, in accordance with one embodiment.

FIG. 1 illustrates a system diagram 100 for defining interactive surveys and processing results from the interactive surveys to generate recommendations for nomenclature to be used on particular page objects of a website. The recommendations of nomenclature are also coupled to a recommended placement of the nomenclature on a page object so as to provide metrics usable for defining what to call particular objects of a website as well as where to place the nomenclature on the website.

Referring to FIG. 1, an interactive survey 102 is provided to enable the generation of geographically dispersed samples. In the interactive survey 102, a plurality of user computers 104 are used to allow survey participants to input their selections and then provide them back over the internet 106 to a processing module 108. Processing module 108 includes an interactive survey generation block 109 that is used to define an interactive survey user interface (UI) 110 that would be used for a particular survey session. In the example provided, the interactive survey UI 110 is shown having a plurality of page objects 112, and a plurality of object names 114. The page objects 112 can define different locations on a page (or part of a page) of a website that may be designed. The object name 114 will define the particular nomenclature that can be selected for the different page objects 112.

Thus, the interactive survey UI 110 can be generated in any number of ways, and displayed in any number of ways so long as the user is provided with interactivity that will allow picking of a particular object name 114, and moving that object name to a particular page object to define a placement. In the example, the interactive survey UI 110 is shown having object name 114' selected and dragged to page object 112', so as to visually and graphically associate object name 114' with page object 112'. By dragging name object 114' over the page object 112', the user has identified his or her preference for nomenclature for the page object and also a placement of where that nomenclature that was selected should reside. For simplicity of explanation, object name 114 was dragged to page object 112', which resides at the left hand corner of the interactive survey UI 110.

It should be understood that the complexity of the design, orientation of the page objects, and the object names 114 will vary depending on the type of website being designed. In some examples, only parts of pages or websites will require (or benefit from) survey data to construct, and in other cases, the entire websites may be provided with survey data recommendations, so as to render a finally designed page.

Continuing with the functional diagram of FIG. 1, the processing module 108 may be defined as part of a number of processes run on one or more computers controlled by an entity desiring to generate and use data from the interactive survey UI 110. Thus, the interactive survey UI 110 is shown provided over the internet 106 to the interactive survey 102, so as to allow the survey participants to define their nomenclature selections and placements. In this example, the survey is conducted for a geographically dispersed sample, although non-geographically dispersed samples may also be performed, depending on the feedback desired for the given application. In some cases, the interactive survey 102 is conducted using a target group that is homogenous in nature. Accordingly, it should be understood that the number and type of survey participants can vary, depending on target audiences, program implementations, and type of website being developed.

Assuming that the survey participants have completed their survey exercise using the interactive survey UI 110, data is fed back through internet 106 to the processing module 108. Survey data will then be analyzed in block 120 to determine the selected nomenclatures for the different page objects of a website, as well as the placement of that nomenclature that was selected. Based on the analysis that is performed in survey data analysis block 120, the processing moves to generate a recommendation of nomenclature and placement on the page objects that were part of the interactive survey UI 110.

In one embodiment, the survey data analysis is provided back to the processing module 108 in the form of numerical data defining the number of participants as well as their selections. The data can then be provided to a website designer to perform analysis on which nomenclature should be used for particular page objects. In this example, the recommendation in block 122 is determined by the designer in view of his or her opinions on what the survey data analysis numbers represent.

In another embodiment, the survey data analysis block 120 can perform a computational process using a computer program that will consider the numerical data received from the participants and apply rules that will generate recommendations for the nomenclature and placement in block 122. If computer processing of the survey is performed, a recommendation can be then generated and presented to the designer with identifications of clear winners for a particular nomenclature to be used on certain page objects, and other recommendations based on rules that applied predefined thresholds, weighting factors, and other applied rules. For instance, a clear winner may be selected by a computer recommendation if over 75% of the people recommended a particular nomenclature placed on a given page object.

The computer can also automatically reduce or increase the significance of certain responses by, for example, applying weighting factor to particular results. For example, if the design knows that the top left of a page should never say "Concluding Remarks", then if participants selected nomenclature "Concluding Remarks" to be placed at the top left of a page, the computer program can discount the survey data. These features are useful to eliminate data that is known to be bad or the result of a disinterested survey respondent. Accordingly, the rules that can be defined are many, and their definition depends on the type of site, the content of the site and the respondent's make up.

Accordingly, it should be understood that the processing module 108 can implement certain automated procedures to identify and provide recommendations, or provide the survey data analysis in formats that will enable human determination of particular selections of nomenclature and associated placement of the nomenclatures.

FIG. 2 illustrates a flowchart diagram 200 defining method operations that can be performed to recommend nomenclature and placement of the nomenclature on particular page objects when designing a web page, in accordance with one embodiment of the present invention.

A "page object", as used herein, can be an icon, a graphic, at tab icon, a feature, an area, a clip, a video, an animation, characters, and in general any object that can be visually seen, heard, interfaced, transmitted, a combination of the above, etc. Thus, a page object can be anything that can be part of a website, a production, a movie, or graphic, presented over the internet, a printed page, cable, satellite, network, or on a standalone computing system (portable or wired).

The method begins at operation 202 where a user interface (UI) is generated for a survey. The UI will enable selection of nomenclature for page objects and placement of the nomenclature to page objects. In operation 204, data for selected nomenclature and placement to each page object is received. As used herein, the data is received at the processing module 108 as described in FIG. 1, in response to selections made by the survey participants through the interactive survey 102.

In one embodiment, the interactive survey UI 110 is configured to provide drag and drop functionality through the user interface. The drag and drop functionality will enable the survey participants to not only select a particular nomenclature from a list of alternatives, but also dynamically move a selected nomenclature in a dragging manner to a selected page object. By moving the nomenclature that was selected to the particular page object, the user is in actuality, performing two selections. One selection is for the nomenclature, and the second selection is where to place the nomenclature. This provides two dimensional data. For more dimensions, a user may, for example, be requested to also select a color for the nomenclature, requested to assign music to nomenclature, assign effects to the nomenclature, assign thumbnail icons to the nomenclature, etc. The more items that are selected for the nomenclature, the more dimensional and rich the data becomes.

In one embodiment, more potential nomenclature items are provided than available page objects, so that survey respondents will have to make actual selections when picking a nomenclature to be associated and dragged to the placement over a page object. In operation 206, data is received for the selected nomenclature and placement for each page object, and that data may be stored in a database until a particular time when all survey participants have completed their survey and have submitted back to the processing module 108. In one embodiment, survey participants can be given a period of time to complete the survey so that data received from the participants regarding their selected nomenclatures and placements for each page object can be efficiently analyzed in operation 208.

The analysis performed in operation 208 can include identifying which particular nomenclature was selected more often for a given page object relative to other nomenclature that was provided as options, as well as the placement most selected by survey participants for each of the nomenclatures that were provided as selection options. Based on this data, metrics can be defined that will enable recommendations to be generated for naming the particular page objects from the multiple options provided. In operation 210, a resolution page having the page objects is generated with the selected nomenclature and placement.

A "resolution page," as used herein, is a page that is used by a designer during the construction/design phase. Thus, the designer may still have to make resolutions regarding final nomenclature and final placement. Once any resolution has been performed by the designer in operation 210, or by way of a program that implements rules for designing a web page, the method moves to operation 212. In operation 212, the page is rendered for the designer. The page will have the page objects with the resolved nomenclature and placement. At this point, the designer is able to integrate the page into a collection of pages, perform additional testing, adjustments, or analysis, and ultimately complete the page that will be integrated with a website. In one embodiment, this process will enable statistical validation of suppositions that may have been made for a particular page design.

It should be understood that the page objects can vary in type so as to include any number of visual elements or modules. The visual elements or modules may be icons, pictures, video, special effects, general graphics, and combinations thereof. The nomenclature in this example is defined by words. However, it should be understood that nomenclature can be extended to colors, sounds, video, icons, letter/word characters (e.g., Japanese, Korean, Chinese, etc.), or generally letters or words provided in any foreign language.

Figure 3A:
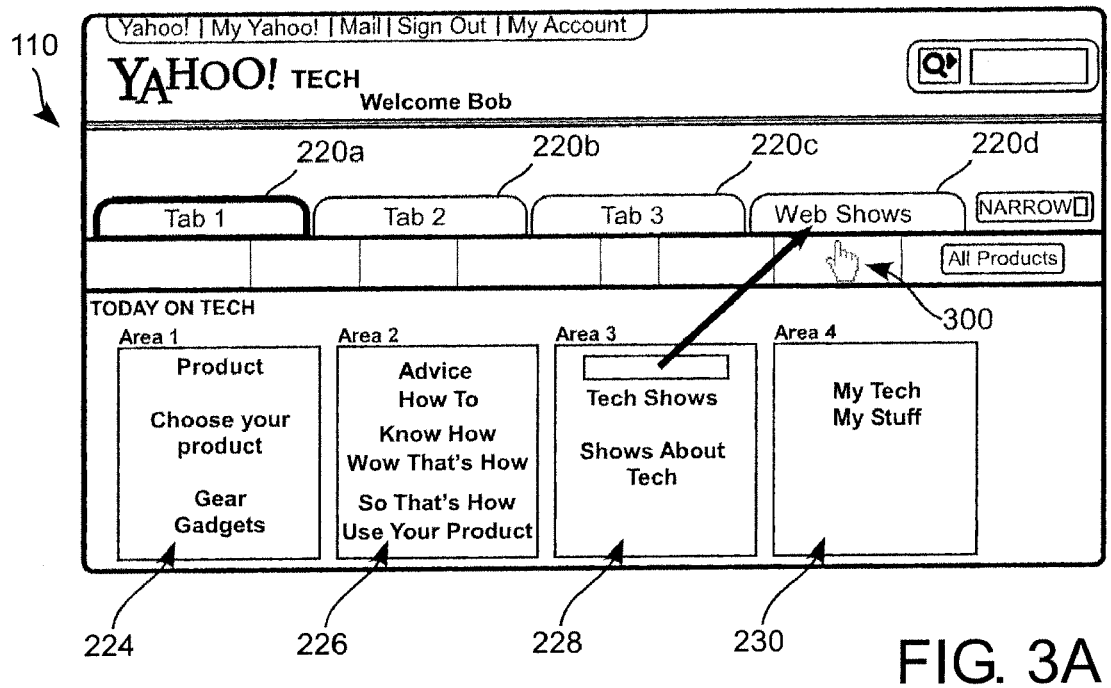
FIGS. 3A-5 illustrate examples of interactive user interfaces, enabling users to select nomenclature items and dragging their selections to particular placements, in accordance with one embodiment.

FIG. 3A illustrates an interactive survey UI 110 having a number of page objects 120a, 120b, 120c, and 120d. The page objects 120 are shown in this example to be tabs along the top of a web page. However, as noted above, the page objects 120 can take on any form and can be interactive in nature, such as tabs. The interactive survey UI 110 also provides a number of nomenclature items 224, 226, 228, and 230. The nomenclature items are placed in areas 1, 2, 3, and 4.

Each area will include a number of alternative nomenclature items that can be selected by the user of the survey and dragged to one of the page objects 120. As shown by hand icon 300, the survey participant has gone into area 3 and selected nomenclature item (Web Shows), to be associated with tab 4 that is defined by page object 220*d*. Consequently, the survey participant has provided two important pieces of metric information by simply selecting Web Shows from area 3 and dragging it to tab 4.

Specifically, of the three nomenclature items provided in area number 3, the user has determined the best nomenclature in his or her view that defines area number 3 and thus can be associated with tab 4 of page object 220*d*. The selection of a particular nomenclature item from an area may require more understanding of what the area is supposed to define.

Figure 3B:
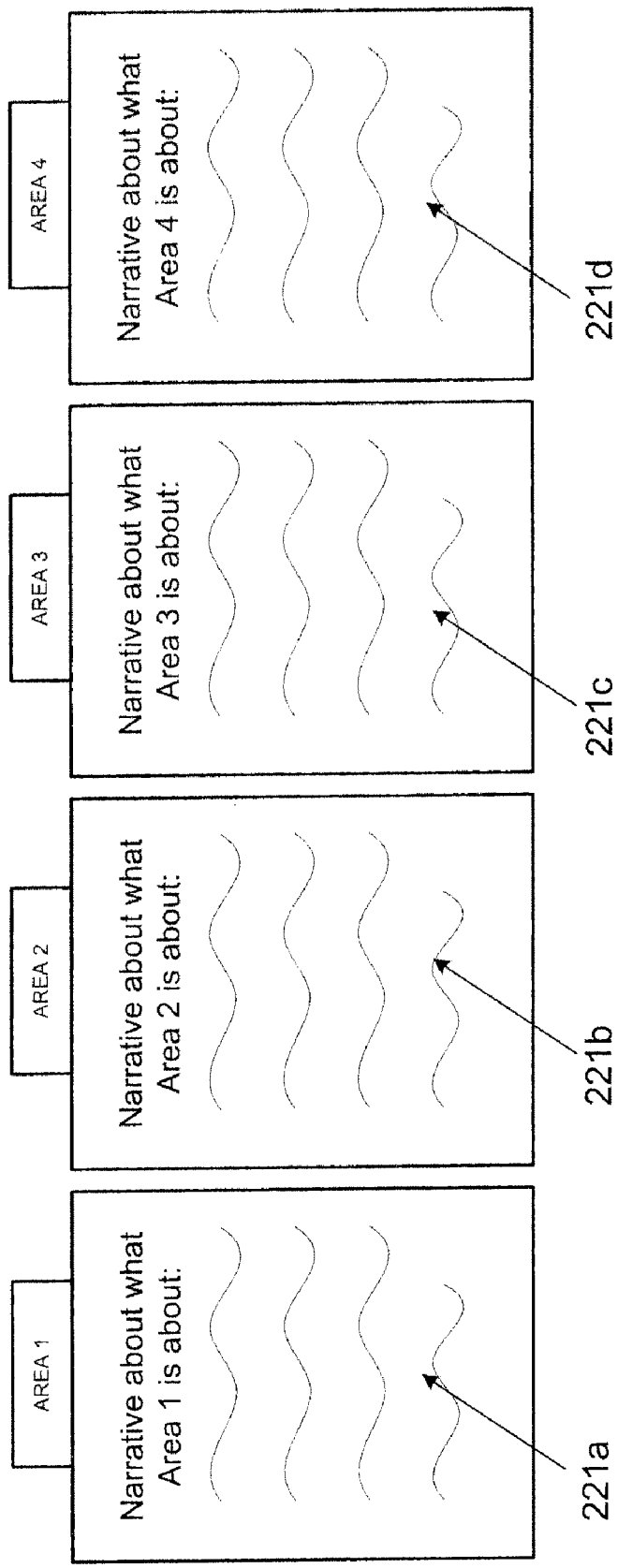

For example, each area can be provided with a narrative 221*a*, 221*b*, 221*c*, 221*d*, shown in FIG. 3B, that may define further what each area will be about. In some circumstances, the various areas are self explanatory by virtue of the various alternatives provided for the different nomenclature. For example, area number 2 lists a number of nomenclature item alternatives that all appear to be defining information about how to use a particular product. In area number 4, where fewer nomenclature items are provided for selection, a user may need more information as to what the purpose or functionality of the selected nomenclature will play once its associates with a page object.

Figure 4:
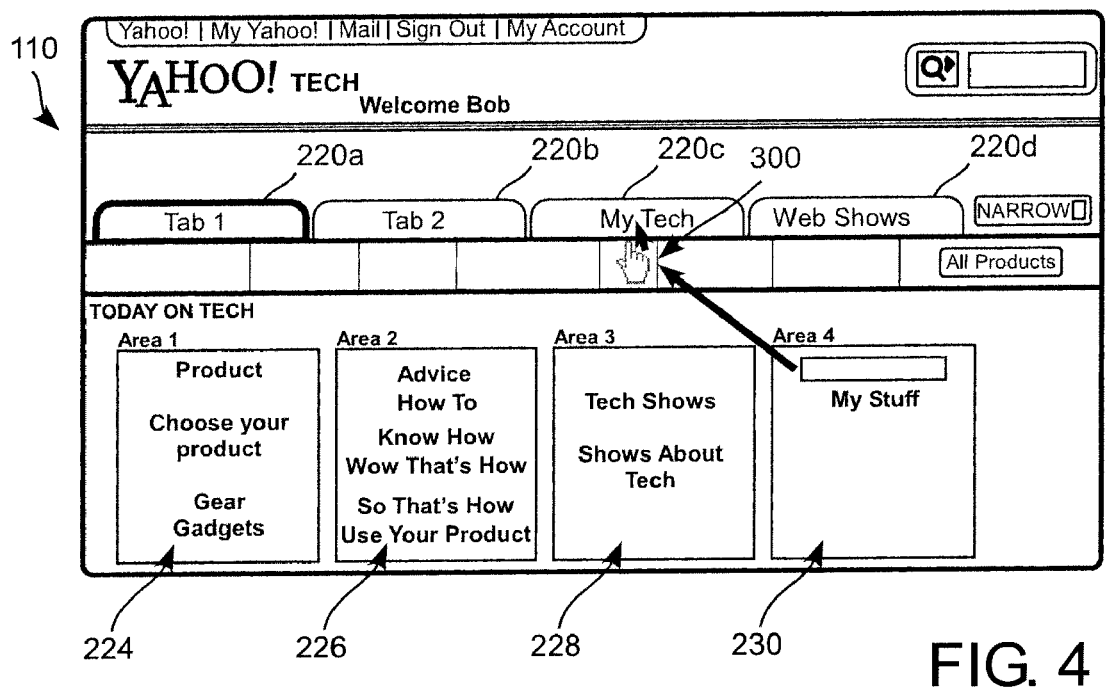
Figure 5:
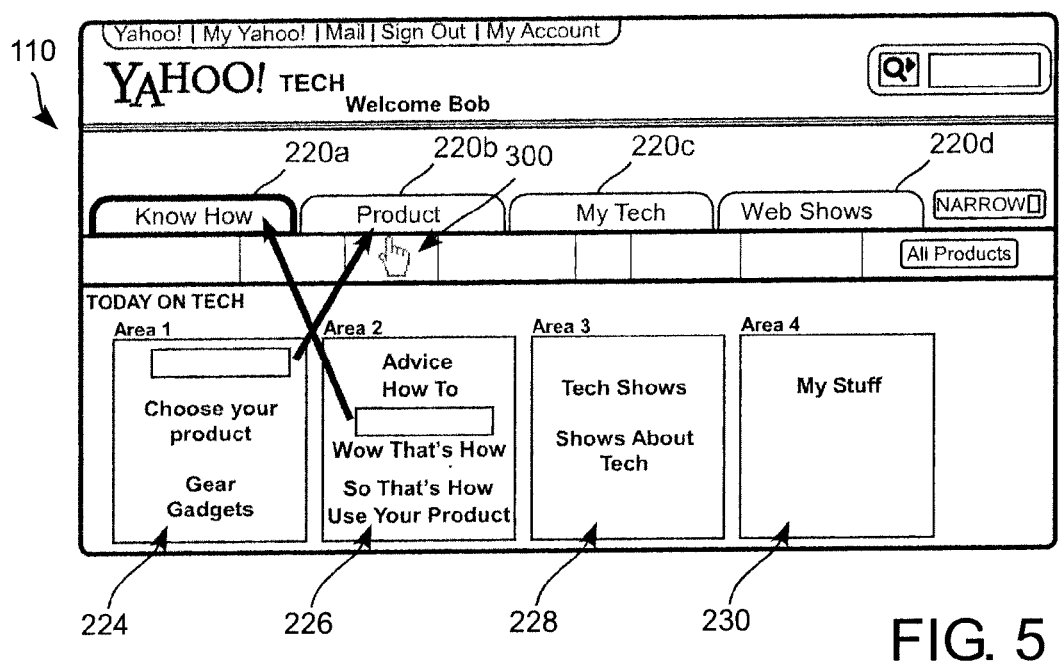

FIG. 4 illustrates the interactive survey UI 110 after a survey participant has completed the selection and dragging using hand icon 300 of a nomenclature item from 230 and defined its placement over tab 3 associate with page object 220*c*. In FIG. 5, the survey participant is also shown making selections from area number 224 of a nomenclature item (Product) which is moved to tab 2 of object 220*b*. Finally, to complete this exemplary survey, the survey participant also dragged and dropped a nomenclature item (Know How) to tab 1 of item 220*a*.

At this point, the user has selected one nomenclature item from each area based on their selection of which nomenclature item best represents the area and has selected a placement for that nomenclature item on the various possible page objects 220*a* through 220*d*. Through the interactive survey UI 110, the user can then complete the survey which forwards metric information regarding the selections of the nomenclature items and the placement back to the processing module 108, shown in FIG. 1.

Figure 6:
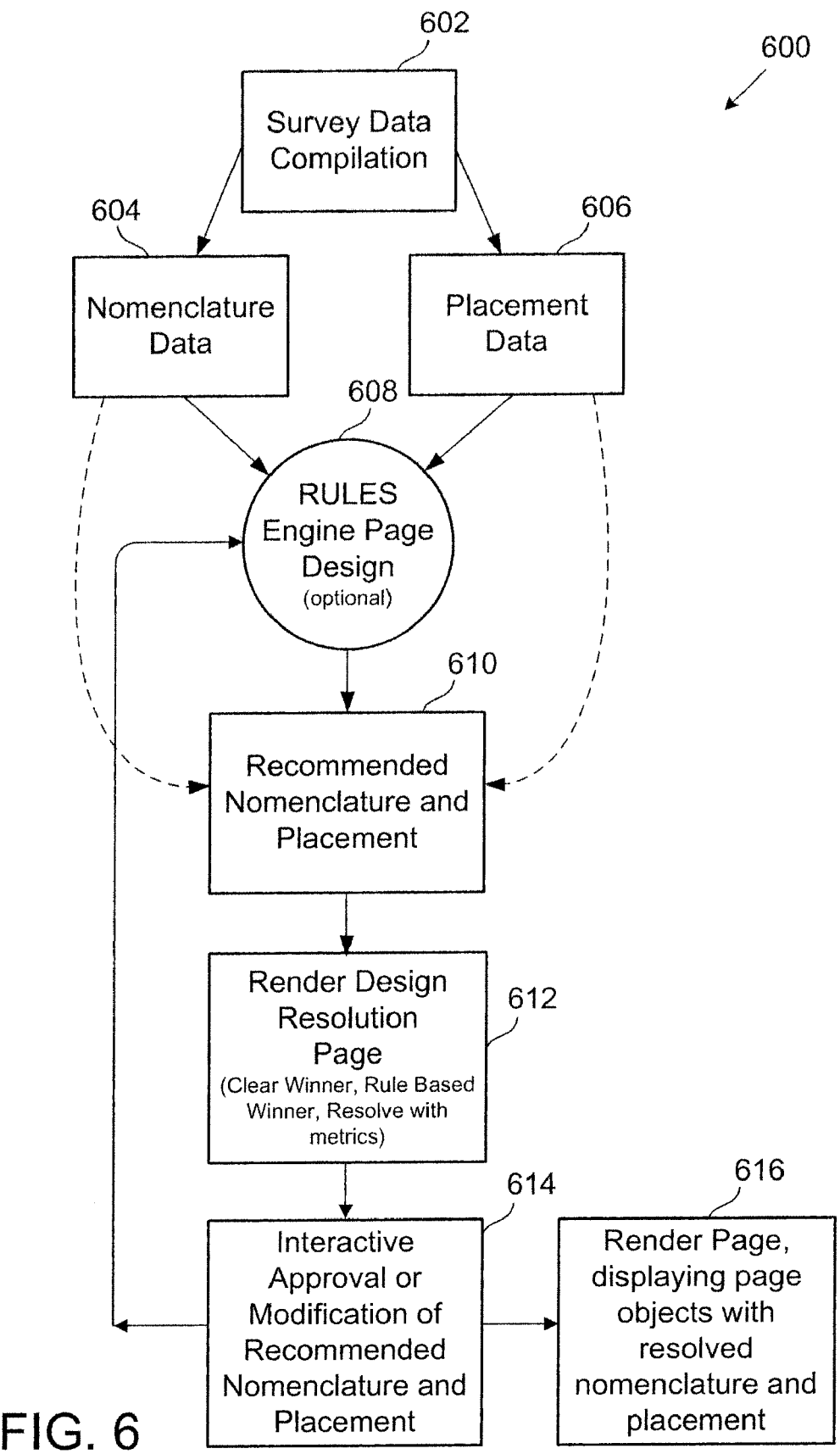
FIG. 6 illustrates processing performed on the metrics obtained from the interactive surveys, in accordance with one embodiment.

FIG. 6 illustrates a flowchart diagram 600 in which data from the selections of nomenclature data and placement data are processed in order to provide recommendations. In operation 602, survey data compilation is performed. Survey data compilation may include receiving of data from the various survey participants of the interactive survey 102. The survey data compilation can be organized in a new manner and for instance, can be organized in a table format defining the number of participants, and their selections.

A program can then be used to parse the survey data compilation 602 to generate the nomenclature data 604 and the placement data 606. Each nomenclature data item can be associated with a particular placement data and the association of which nomenclature has been selected, and its placement, can then be provided to a rule engine for page design in operation 608. The rules engine 608 is an optional module which can be used to dynamically analyze nomenclature data and placement data.

The analysis performed by the rule engine 608 can include applying rules that are preset by a designer or designers, so as to filter through the nomenclature data and placement data in order to generate a recommendation. The recommendation can also be adjusted using a weighting process, where certain rules are provided more weight than others, or the recommendations can be provided in a raw format, where conflicts between what to call a particular objects is in conflict and placement may also be in conflict. In operation 610, the data for making recommendations of nomenclature and placement is presented.

The presentation of the data can be in the form of a numerical table, graphical representation, results in combined graph and tables, or any combination thereof. If the rules engine 608 is applied, the recommended nomenclature and placement may be provided with reasons for the selection. In some cases, the recommendations will define a clear winner of a particular nomenclature item and a placement for that nomenclature item. In some circumstances, the rules engine will make a decision as to which nomenclature item and/or placement to apply. If the rules engine participates in generating or modifying a recommendation based on rules, the recommendation is tagged (by notations, graphics, shading or the like), to identify that recommendation as coming from a predefined rule.

Still further, a rule engine process may not be able to determine which nomenclature and/or placement to apply when the statistical data coming back from the survey does not provide concrete enough data for the rules engine to produce a recommendation. In such a case, the recommendation may be to provide multiple nomenclature items for a given page object and/or multiple placements. If multiples are given for a given nomenclature and/or placement, the rules engine may provide data as to why a recommendation was not generated, and provide raw data to enable a designer to impart its own determination.

In operation 612, a design resolution page is rendered. A design resolution page, as noted above, is a page that includes the page objects arranged based on the design for a given page, where particular nomenclatures have been assigned to particular page objects. As noted above, different page objects may be tagged, or visually identified so as to label them as clear winners based on the survey data, or winners based on a rule based analysis, or page objects that require a designer to make an ultimate resolution as to what to call a particular page object or where to place that particular nomenclature.

In operation 614, a program is provided to interactively allow approval or modification of the recommended nomenclature and placement. In one example, the interactive approval or modification can be provided by way of a user interface that allows a designer to check off which selections defined by the survey will be accepted, which will be changed, or which will be eliminated altogether based on other data. In one embodiment, based on the interactive approval or modification performed by the designer in operation 614, data regarding any interactive approval or modifications may be provided back to the rules engine page design 608.

This manner, the rules can be provided with not only preset rules identified by a designer, but learned rules based on knowledge accumulated from interactive approval or modifications made by a designer. Over time, the rules engine 608 will be able to provide more accurate resolution for particular nomenclature and its associated placement, and will thus learn the preferences of a particular designer. Once the final approval or modifications are performed, in operation 616, a page is rendered displaying the page objects with the resolved nomenclature and associated placement of the nomenclature.

At this point, the page can be further tested, adjusted, modified, partially activated, fully activated, or re-designed.

FIG. 7 illustrates a table defining selections made by 8 separate persons (i.e., respondents to the interactive survey). It will be readily apparent that if more persons were included in the survey, the data could provide better granularity and differentiation between selections. However, for ease of presenting the functionality, only 8 person respondents are illustrated. As shown, each person can have different selections of nomenclature as well as desired placements of those particular nomenclatures. For ease of understanding, the nomenclature in the left-hand column is associated with the nomenclature used in areas 1, 2, 3 and 4, in FIGS. 3A, 4, and 5.

FIG. 8 illustrates example metrics on the nomenclature that was selected. A nomenclature is analyzed and a determination is made that particular nomenclature items were selected more times than others, and thus, those nomenclature items would be ranked higher if there were no conflicts between multiple nomenclature items in a given group. In this example, there are no conflicts and area 1 has identified "Choose Your Product" as the selected nomenclature, area 2 has selected "Know How" as the nomenclature, area 3 has selected "Tech Shows" as the nomenclature, and area 4 has identified "My Stuff."

For area 1, it is recommended to place the selected nomenclature in tab 2, as tab 2 has received the most selections from the survey. For area 2, the selected nomenclature received the same amount of votes for placing the nomenclature in tab 2 or tab 3. Thus, resolution would be required. In area number 3, the nomenclature was determined to be placed in tab 4. In area 4, the highest number of survey respondents also recommended to place the nomenclature of area 4 into tab 4. Therefore, there is a conflict as two nomenclature items suggest or recommend the same tab (e.g., page object).

In FIG. 9, the selected word (e.g., nomenclature) is shown in column 1, a conflict resolution is identified in column 2, and a reason for resolving the conflict in one manner or another is identified in column 3. In this example, the nomenclature for area 1 was a clear winner, and therefore should be placed in tab 2. The nomenclature for area 2 should be placed in tab 3. The reason for placing area 2 nomenclature into tab 3 is explained by a reason. The reason can be provided by the rules engine, or can be resolved by the designer. Tab 2 is strongly preferred for a different word, and therefore, tab 3 should be the selected item for area 2.

This reason may be confirmed by designer, or vetoed by the designer, depending on the particular circumstances of the design. For area 3, the nomenclature selected should be placed in tab 4, as tab 4 is a clear winner. For area 4, the nomenclature selected should be placed in tab 1. The reason for placing it in tab 1 is that tab 1 is the second choice, based on survey respondents, but tab 4 was more preferred for another word, and thus, tab 4 was already assigned.

As mentioned above, the reasons for resolution can be determined either by the designer, or by implementing an algorithm that operates on rules that are generated based on known conflicts or potential conflicts that may result. In one embodiment, a weighting process can also be performed, such that ties or uncertainties can be recommended one way or the other, based on predetermined weights that may be assigned.

It will be obvious, however, to one skilled in the art, that the present invention may be practiced without some or all of these specific details. In other instances, well known process operations have not been described in detail in order not to unnecessarily obscure the present invention. For instance, "drag and drop" is provided as one example, although other dynamically enabled selection techniques are possible. In one example, graphics can be provided on a UI and the graphics can be moved, altered, shifted, cut and pasted, selected from pull down menus, deleted and retyped, etc. As such, a UI is one that enables an interesting presentation of data, objects, features, images, videos, colors, sounds, and the like, which can be selected and arranged to develop metrics. The metrics can then be used for later design and implementation in the design of a page of a website. Broadly stated, a "page" can be any size, form, display, or image(s) that can be rendered, and presented on a screen by way of a connected network, such as the Internet or local Intranet (wired or wireless). Pages may also be extended to physical pages having some design feature, such as packaging, magazines, articles, books, etc.

In still another embodiment, a business method for collecting metrics to be used for defining aspects of a web page, is defined. The business method includes presenting a user interface to a plurality of respondents of a survey, where the user interface presents a plurality of nomenclature items and a plurality of page objects. The method includes instructing the respondents to select one of the plurality of nomenclature items and to associate the selected nomenclature item with one of the plurality of page objects. The associating defines a preference for the selected nomenclature and a placement of the selected nomenclature at the selected page object.

The method then collects data from the plurality of respondents regarding their preference for the selected nomenclature and a placement of the nomenclature. In one embodiment, each of the page objects is one of an icon, a graphic, at tab icon, a feature, an area, a clip, a video, an animation, characters, or a combination thereof. Data that is collected is used to formulate decision regarding what to call the page objects and where to place the page objects when designing a page of the website. In a further aspect, the collected data may be used to formulate business decisions regarding website audience targeting. Other business related aspects may also be possible, in conjunction with the processing of the data that results and the formulating of the surveys through the interactive user interfaces.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer implemented method for conducting interactive surveys for defining aspects of a web page, comprising:
   (a) generating an interactive survey user interface (UI), the interactive survey UI providing a plurality of selectable nomenclature items for a plurality of page objects of the web page, each of the page objects being set at specific locations on the web page and will remain at the specific locations based on a page design of the web page;
   (b) detecting selection of one nomenclature item from the plurality of selectable nomenclature items, each selectable nomenclature item being predefined and listed for selection;
   (c) detecting movement of the one nomenclature item to one of the plurality of page objects to define a placement for the one nomenclature item; and
   (d) analyzing the selection of the one nomenclature item and the defined placement to provide recommendation for rendering the page object on the web page;
   wherein the operations (b) through (c) are repeated for a plurality of survey participants, and processing (d) using data obtained from the repeat of (b) through (c);
   wherein the above operations are executed by one or more computers.

2. The computer implemented method for conducting interactive surveys as recited in claim 1, wherein the move operation is a drag and drop operation, the drag and drop operation enabling selection of the one nomenclature item and dragging to the one of the plurality of page objects.

3. The computer implemented method for conducting interactive surveys as recited in claim 2, wherein the drag and drop operation provides an instant visual display of an association between the selected one nomenclature item and the defined placement.

4. The computer implemented method for conducting interactive surveys as recited in claim 1, wherein the recommendation for rendering the page object on the web page includes providing metrics for recommendation.

5. The computer implemented method for conducting interactive surveys as recited in claim 4, further comprising:
   processing the metrics through a rules engine, the rules engine applying predefined thresholds and weighting to establish refined recommendations based on the analysis of data including selections of the nomenclature and placements.

6. The computer implemented method for conducting interactive surveys as recited in claim 1, wherein particular ones of the plurality of page objects will be defined with particular nomenclature items based on statistical data, identifying the recommended nomenclature item and placement as selected for the page object with a designation of its selection.

7. The computer implemented method for conducting interactive surveys as recited in claim 5, wherein particular ones of the plurality of page objects will be defined with particular nomenclature items based on resolved data produced by the rules engine, defining the recommended nomenclature item and placement for the page object a rule-based winner.

8. The computer implemented method for conducting interactive surveys as recited in claim 1, wherein particular ones of the plurality of page objects will be defined with more than one recommended nomenclature item or more than one placement for the page object, establishing page object that is designer selectable using the recommendations.

9. The computer implemented method for conducting interactive surveys as recited in claim 1, further comprising:
   rendering a resolution page using the recommendations, the resolution page identifying at least one of,
   page objects with a statistical selection for nomenclature and placement,
   page objects with rule-based selection for nomenclature and placement, or
   page objects to be designer selectable for nomenclature and placement.

10. The computer implemented method for conducting interactive surveys as recited in claim 5, further comprising:
    rendering a resolution page using the recommendations, the resolution page providing a visual identifier of one or more of,
    (i) page objects with a statistical selection for nomenclature and placement,
    (ii) page objects with rule-based selection for nomenclature and placement, and
    (iii) page objects to be designer selectable for nomenclature and placement;
    wherein designer selectable items produce data that is fed back to the rule based engine.

11. A computer implemented method for conducting interactive surveys for defining aspects of a web page, comprising:
    generating an interactive survey user interface (UI), the interactive survey UI providing a plurality of selectable nomenclature items for a plurality of page objects of the web page, each of the page objects being set at specific locations on the web page and will remain at the specific locations based on a page design of the web page;
    detecting selection of one nomenclature item from the plurality of selectable nomenclature items, each selectable nomenclature item being predefined and listed for selection, a drag and drop operation enabling the selection of the one nomenclature item and dragging to the one of the plurality of page objects to define a placement for the one nomenclature item; and
    receiving the selection of the one nomenclature item and the defined placement to build metrics from multiple survey participants, the metrics being used to define recommendation for rendering the plurality of page objects on the web page;
    wherein the above operations are executed by one or more computers.

12. The computer implemented method of claim 11, wherein the drag and drop operation provides an instant visual display of an associate between the selected one nomenclature item and the defined placement.

13. The computer implemented method of claim 11, wherein the recommendation for rendering the page object on the web page includes displaying the metrics for recommendation.

14. The computer implemented method of claim 11, further comprising:
processing the metrics through a rules engine, the rules engine applying predefined thresholds and weighting to establish refined recommendations for nomenclature and placements.

15. The computer implemented method of claim 14, wherein the web page is a resolution page, the resolution page providing a visual identifier of at least one of,
page objects with a statistical selection for nomenclature and placement,
page objects with rule-based selection for nomenclature and placement, or
page objects to be designer selectable for nomenclature and placement.

16. The computer implemented method of claim 15, wherein designer selectable items produce data that is fed back to the rule based engine.

17. The computer implemented method of claim 11, wherein the metrics are defined in numerical form.

18. The computer implemented method of claim 17, wherein the numerical form of the metrics can rendered in one or a combination of tabular form, a chart form, a table form, an icon form, or a graphical form.

19. Computer readable media including program instructions tangibly stored thereon, when executed by one or more computers conducts interactive surveys for defining aspects of a web page, the computer readable media comprising:
program instructions for generating an interactive survey user interface (UI), the interactive survey UI providing a plurality of selectable nomenclature items for a plurality of page objects of the web page, wherein each of the page objects being set at specific locations on the web page and will remain at the specific locations based on a page design for the web page, and wherein each selectable nomenclature item being predefined and listed for selection;
program instructions for enabling selection of one nomenclature item from the plurality of selectable nomenclature items, the enabling is facilitated through a drag and drop operation, the drag and drop operation enabling selection of the one nomenclature item and dragging to the one of the plurality of page objects to define a placement for the one nomenclature item; and
program instructions for receiving the selection of the one nomenclature item and the defined placement to build metrics from multiple survey participants, the metrics being used to define recommendation for rendering the plurality of page objects on the web page.

20. A business method for collecting metrics to be used for defining aspects of a web page, comprising:
presenting a user interface to a plurality of respondents of a survey, the user interface presenting a plurality of nomenclature items and a plurality of page objects;
instructing the respondents to select one of the plurality of nomenclature items and to associate the selected nomenclature item with one of the plurality of page objects, the associating defines a preference for the selected nomenclature and a placement of the selected nomenclature at the selected page object; and
collecting data from the plurality of respondents regarding their preference for the selected nomenclature and a placement of the nomenclature;
wherein each of the page objects is set at specific locations on the web page and will remain at the specific locations based on a page design for the web page, and wherein each selectable nomenclature item being predefined and listed for selection;
wherein the above operations are executed by one or more computers.

21. The business method of claim 20, wherein each of the page objects is one of an icon, a graphic, a tab icon, a feature, an area, a clip, a video, an animation, characters, or a combination thereof.

22. The business method of claim 21, wherein the collected data is used to formulate decision regarding what to call the page objects and where to place the page objects when designing a page of the website.

23. The business method of claim 21, wherein the collected data is used to formulate business decisions regarding website audience targeting.

* * * * *